United States Patent [19]

Russell

[11] Patent Number: 5,530,390
[45] Date of Patent: Jun. 25, 1996

[54] RANDOM CLOCK GENERATING CIRCUIT AND METHOD FOR CONTROL OF ELECTRICAL SYSTEMS THEREOF

[75] Inventor: David M. Russell, Newbury, Great Britain

[73] Assignee: Soundcraft Electronics Limited, England

[21] Appl. No.: 302,641

[22] PCT Filed: Mar. 11, 1993

[86] PCT No.: PCT/GB93/00512

§ 371 Date: Sep. 8, 1994

§ 102(e) Date: Sep. 8, 1994

[87] PCT Pub. No.: WO93/18585

PCT Pub. Date: Sep. 16, 1993

[30] Foreign Application Priority Data

Mar. 11, 1992 [GB] United Kingdom .................. 9205291

[51] Int. Cl.⁶ ............................... H03K 3/84; H04L 9/06
[52] U.S. Cl. ........................ 327/164; 327/175; 364/717; 331/78; 380/49; 375/356
[58] Field of Search ..................... 327/164, 165, 327/172, 173, 174, 298, 299, 34, 175; 331/78; 364/717; 380/49; 375/354, 356, 359

[56] References Cited

U.S. PATENT DOCUMENTS

| | | |
|---|---|---|
| 4,291,386 | 9/1981 | Bass .......................... 331/78 |
| 4,531,022 | 7/1985 | Pioli .......................... 331/78 |
| 4,839,606 | 6/1989 | Hallock ..................... 331/78 |
| 4,855,944 | 8/1989 | Hart .......................... 331/78 |
| 5,153,532 | 10/1992 | Albers et al. .............. 331/78 |
| 5,454,040 | 9/1995 | Russell ...................... 331/78 |

FOREIGN PATENT DOCUMENTS 0163313  of 1985  European Pat. Off. .
1495748  of 1977  United Kingdom .

OTHER PUBLICATIONS

Patent Abstracts of Japan, vol. 12. 393 (E-670) 19 Oct. 1988 & JP, A 63 133 872 6 Jun. 1988.
Patent Abstracts of Japan, vol. 16, No. 263 (E-1216) 15 Jun. 1992 & JP, A, 40 58 756 25 Feb. 1992.

Primary Examiner—Timothy P. Callahan
Assistant Examiner—Terry L. Englund
Attorney, Agent, or Firm—Nixon & Vanderhye

[57] ABSTRACT

A digital controller provides digital signals to audio modules; the digital signals include both clock signals and data. All of the logic circuits of the controller and of the modules are clocked on the receipt of a rising edge. However, to avoid interference from regular clock pulses, the clock pulses are altered to have a variable mark-space ratio which means that the clock pulses arrive at random times and have random widths and thus appear to be randomized. Use of randomized clock signals can avoid tones appearing in an audio system, and also avoids interference effects in other electrical systems. The use of randomized clock signals is particularly helpful when designing digital circuits which meet current regulations controlling electromagnetic emissions.

13 Claims, 8 Drawing Sheets

RANDOM CLOCK GENERATING CIRCUIT AND METHOD FOR CONTROL OF ELECTRICAL SYSTEMS THEREOF

The present invention relates to methods of controlling electrical systems, and to electrical systems using such methods.

Many electrical systems, particularly those incorporating processor means or other logic circuits, utilise clock signals. However, clock signals contain high frequency harmonics and these cause interference effects. In audio systems, the harmonics may be within the audio band, and this is directly audible. In other environments intermodulation can generate unwanted spikes and tones. These interference effects can make it difficult, for example, to design digital circuits which meet EC regulations controlling electromagnetic radiation.

In some cases it is possible to avoid the worst interference effects by shielding such that there is no coupling between circuits, but this is an expensive solution which is never totally successful. Furthermore, a single spike in a frequency spectrum is difficult to cope with even if the spike has a relatively low level as compared to background noise.

According to the present invention there is provided a method of controlling an electrical system comprising at least one system component arranged to be controlled by the application of a clock signal, the method comprising the step of utilizing at least one randomised clock signal, said randomised clock signal comprising a series of pulses arranged to have a random mark-space ratio.

Because the clock signals are randomised they are no longer cyclic or repetitive, and individual spikes no longer appear in the frequency spectrum. The resulting frequency spectrum is relatively flat, with a raised noise floor, and this makes it easier, for example, to control electromagnetic emissions.

In an embodiment, the method further comprises the steps of providing a regular clock signal for the system, and then randomising said regular clock signal to provide one or more randomised clock signals for controlling system components.

Preferably, the method further comprises the step of applying a respective randomised clock signal to each system component which is controlled by the application of a clock signal, the step of generating the or each randomised clock signal by dividing a regular clock signal.

In an embodiment, the or each randomised clock signal may be generated by way of a random number generator to which a regular clock signal is applied.

Preferably, said electrical system utilises digital control means arranged to generate and apply said randomised clock signal to logic means of said system, said logic means being arranged to be controlled by the arriving clock pulses of said randomised clock signal. For example, said logic means may be clocked by edges of the randomised clock signal.

In one embodiment, one selected edge of each said randomised clock signal occurs substantially concurrently with a selected edge of said regular clock signal. Preferably, said selected edges are rising edges.

In a preferred embodiment, said randomised clock signal is generated by way of a random number generator arranged to apply a random sequence to one input of a bistable circuit, and further comprising applying the regular clock signal to the clock input of said bistable circuit so that rising edges of the randomised output signal coincide with rising edges of the regular clock signal.

In a preferred embodiment, where said electrical system utilises digital control means, the method further comprises the steps of coding digital signals, transmitting the coded digital signals to at least one system component, and at the or each said system component receiving and decoding the coded digital signals, wherein the step of coding the digital signals comprises randomising or scrambling said digital signals such that they are not cyclic or repetitive.

In a preferred embodiment, the electrical system comprises a number of system components connected serially to form a serial loop, and said method comprises the step of transmitting coded digital signals undirectionally around the serial loop.

Preferably, one said system component is arranged to receive and decode Transmitted coded digital signals, and said one component is further arranged to encode the digital signals and transmit said coded digital signals to a succeeding system component.

In a preferred embodiment, the step of coding the digital signals comprises generating a pseudo random bit sequence from said digital signals.

Preferably, the step of decoding the coded digital signals comprises using a technique complementary to the coding technique.

In an embodiment, digital signals are coded by logically combining the digital signals with the output of a random number generator to provide the pseudo random bit sequence. In such circumstances, the coded digital signals are subsequently decoded by logical combination with the same pseudo random bit sequence.

It is possible to use the output from a single random number generator to provide the pseudo random bit sequence for both encoding and decoding. Alternatively, similar random number generators may be provided for both coding and decoding, the coding and decoding generators being synchronously clocked. However, in a preferred embodiment, a maximal length random number generator is arranged for coding, and a complementary maximal length random number generator is used for the decoding.

The present invention also extends to an electrical system comprising at least one system component utilising clock signals, and control means for generating a clock signal for application to said system component, wherein said control means comprises means for generating a clock signal comprised of a series of pulses arranged to have a random mark-space ratio.

In an embodiment, said clock signal generating means comprises a random number generator arranged to be clocked by a regular clock signal and arranged to generate said randomised clock signal.

Preferably, said random number generator has a clock input arranged to receive a regular clock signal, and comprises one or more tapped shift registers.

In a preferred embodiment, said clock signal generating means comprises a bistable circuit arranged to receive both said regular clock signal and an output from said random number generator, and wherein an output of said bistable circuit is said randomised clock signal.

In one embodiment, said electrical system is an analogue system and comprised digital control means for controlling said system component(s).

In an embodiment, the analogue system comprises at least one audio component, said digital control means is arranged to generate digital signals for controlling said audio component, and coupling means couple said digital control means to said audio component for transmitting said digital signals to said audio component, wherein coding means are provided for coding the digital signals for transmission to said audio component, wherein said audio component comprises decoding means for decoding coded digital signals received, and wherein said coding means are arranged to randomise or scramble said digital signals such that said coded digital signals are not cyclic or repetitive.

In a preferred embodiment, said digital control means comprises a controller which comprises or is coupled to processing means, for example, a microprocessor.

In a preferred embodiment, the controller is serially coupled to the one or a first one of said audio components. Preferably, the audio system is a modular system formed of a plurality of serially coupled audio components, the first one of which is coupled to said controller, and a last one of which is also connected to said controller to define a serial loop.

Preferably, each said audio component comprises a decoder for receiving coded digital signals from the controller or a preceding audio component, and preferably each said audio component comprises a coder for coding digital signals and transmitting them to a succeeding audio component or said controller.

The decoder of each said audio component is coupled by coupling means to a preceding audio component or to the controller, and the coder of each said audio component is coupled to a succeeding audio component or to the controller.

In a preferred embodiment, the coupling means for coupling each said coder or decoder is provided by a bus. Preferably, the bus is arranged so that the output of one audio component is not directly connected to the output of a preceding or succeeding audio component.

Preferably, the coder of the or each said audio component comprises means for logically combining the digital signals with a pseudo random bit sequence. In this case, the decoder of the or each said audio component comprises means for logically combining the coded digital signals with a complementary pseudo random bit sequence.

In an embodiment, each pseudo random bit sequence is generated by a pseudo random number generator.

For example, each pseudo random number generator may comprise a clocked shift register with a feedback circuit and a tapped output. Preferably, the pseudo random number generator is arranged to operate as a maximal length sequencer.

The controller of said analogue system may also be provided with a coder for coding digital signals, and a decoder for decoding digital signals. Preferably, the coder and decoder of the analogue system are configured as defined above.

In a preferred embodiment, the digital signals are a sequence of data bits.

Embodiments of the present invention will hereinafter be described, by way of example, with reference to the accompanying drawings, in which.

In many modern electrical circuits clock signals are used, for example, to trigger actions and/or to synchronise the actions of a number of elements or circuits. However, clock signals are generally pulsed waveforms with fast rise and fall times. Such signals are rich in harmonics up to frequencies as high as several hundred megahertz. The sharper the transitions of the pulse waveform, the higher in frequency the harmonics extend. Furthermore, as the mark-space ratio increases, the energy becomes shifted to higher harmonics.

The applicants appreciated that if clock signals were used to control an audio system, for example, the fundamental frequency could render the clock signals directly audible and/or intermodulation effects could produce tones and whistles on the audio output. In developing a digitally controlled audio system, the applicants took steps to ensure that the clock signals were not audible. However, and as is also described below, the developed technique can also be utilised with advantage in any circuit, system or environment in which clock pulses are used.

The specific embodiments of the invention as described and illustrated relate to an audio console, but it will be understood that the present invention is not limited to audio systems, nor indeed to digitally controlled analogue systems. The present invention has universal applicability to any electrical system employing clock signals.

Figure 1:
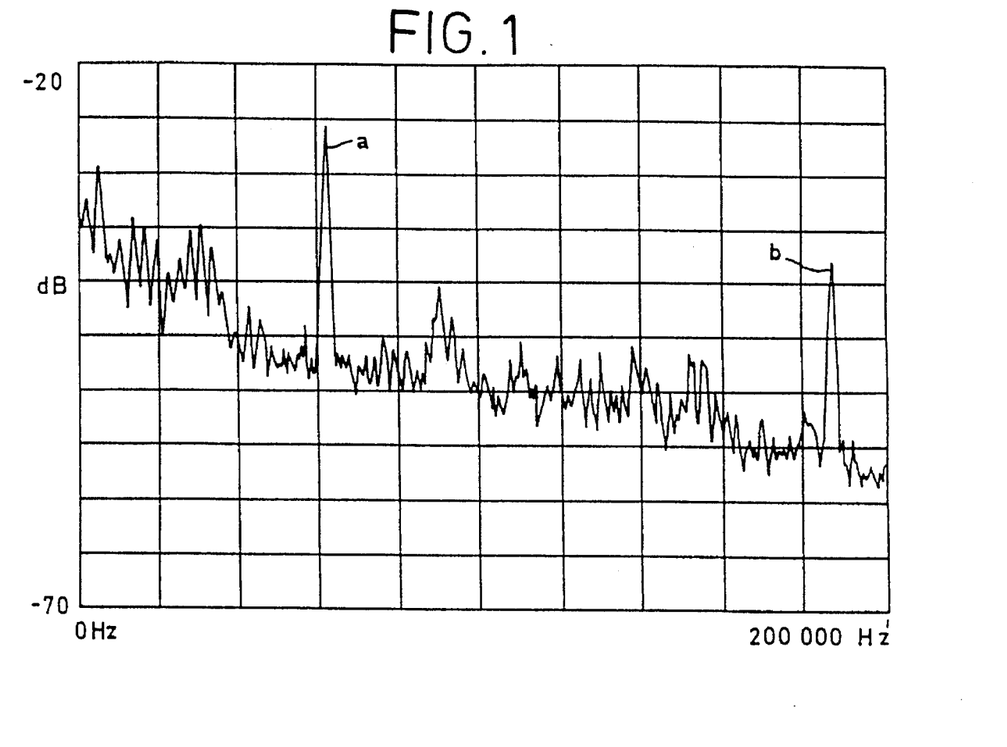
FIG. 1 shows a spectrum measured on a spectrum analyzer of the background noise from an audio console controlled by digital signals over the frequency range 0 Hz to 200 KHz.

FIGS. 1 to 6 illustrate graphically the problems and the solution now proposed by the applicants. FIG. 1 shows a frequency spectrum, measured by a spectrum analyzer, developed by an audio mixing console which is controlled by a digital controller. In this respect, the digital controller incorporates a clock running at 62.5 KHz. Each channel of the audio mixing console was arranged to receive data bit packets of 22 bits in an associated shift register, and each channel is provided with a mute circuit and a level control circuit which was activated.

FIG. 1 shows the noise generated in the audio console, and the large spike a generated by the 62.5 KHz clock is clearly visible. It will also be seen that there is also a spike b which is the third harmonic of the clock signal. Intermodulation of these spikes with other interfering signals causes objectionable audio tones.

Figure 2:
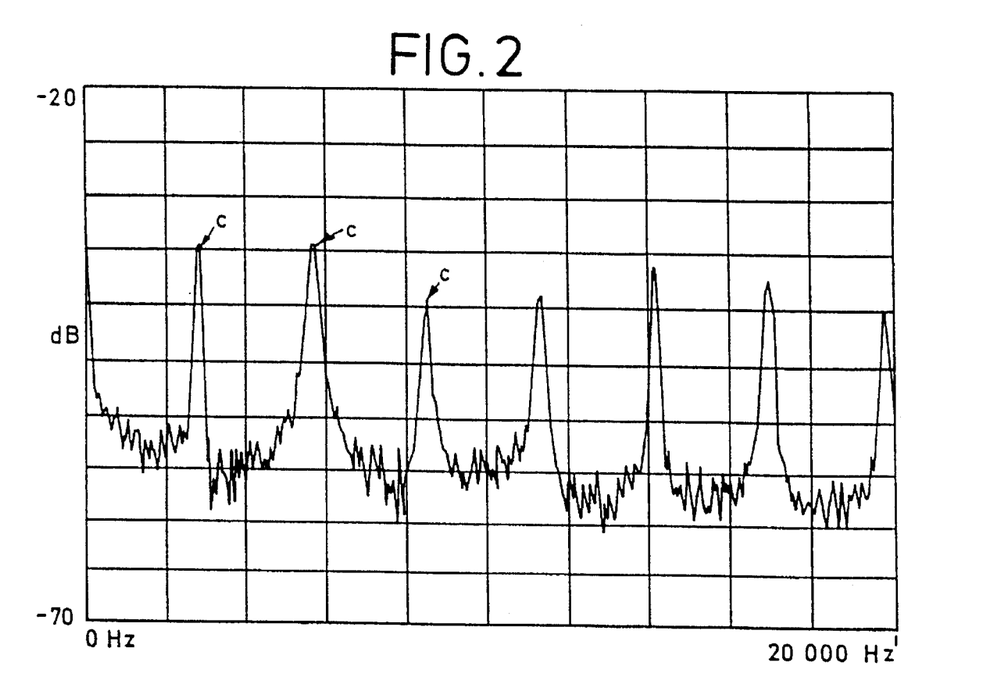
FIG. 2 shows an expanded part of the spectrum of FIG. 1 over the frequency range 0 Hz to 20 KHz.

FIG. 2 shows a spectrum similar to that of FIG. 1 but over the frequency range 0 Hz to 20 KHz only. In FIG. 2 a series of spikes c are clearly visible. It will be appreciated that because the data packet for each 22 bit channel is identical, a 22 bit data pattern repeats itself. The digital control signals therefore produce a frequency component at 62.5 KHz/22 that is at 2.8 KHz, and it will be immediately be appreciated that the spikes c are at 2.8 KHz and at its harmonics. Clearly, these spikes c are produced by the repetitive data pattern. The spikes c, as the spikes a and b, generate most objectionable tones at the audio output of the mixing console.

As will be described in more detail below, the effects of these digital signals are disguised by making the effects appear as white noise. This is done by randomising or scrambling the digital signals such that these are not cyclic or repetitive and therefore do not exhibit a fundamental frequency.

Figure 3:
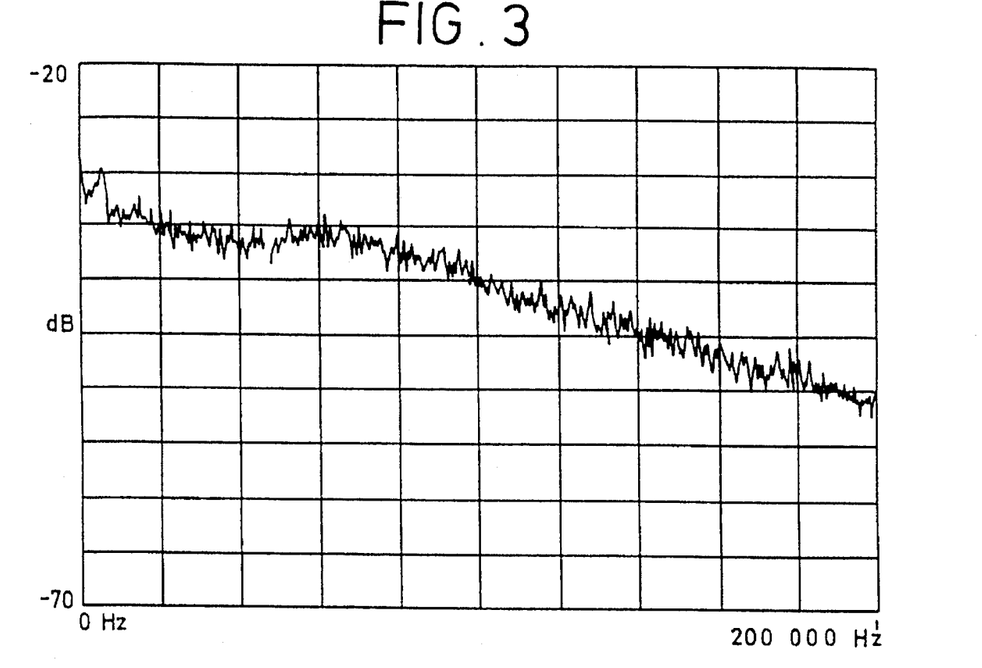
FIG. 3 shows a spectrum taken over the same range as FIG. 1 but showing the effect of randomised clock pulses on the audio console.
Figure 4:
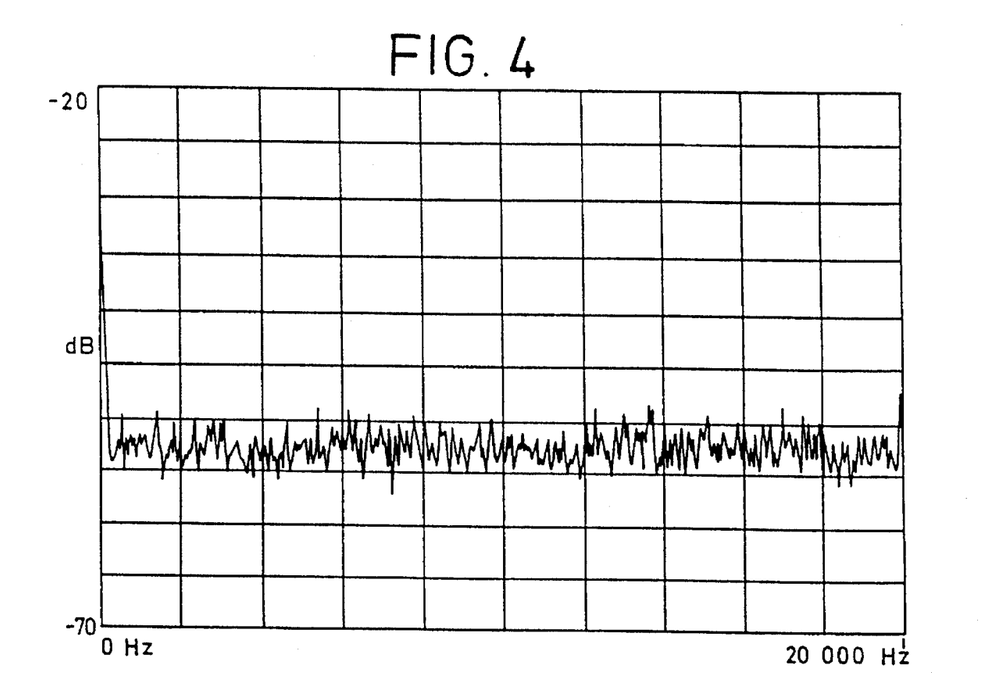
FIG. 4 shows a spectrum taken over the same range as FIG. 2 but showing the effect of randomised data signals on the audio console.

FIG. 3 is a plot similar to that of FIG. 1 but taken after the 62:5 KHz clock had been randomised. It will be seen from FIG. 3 that in this situation the spikes a and b of FIG. 1 have been completely removed, at the expense of a raised noise floor. Similarly, FIG. 4 shows a plot similar to that of FIG. 2 taken after the data pattern has been randomised. Again, the spikes c have disappeared and the noise floor as compared to that of FIG. 2 has been raised.

Figure 5:
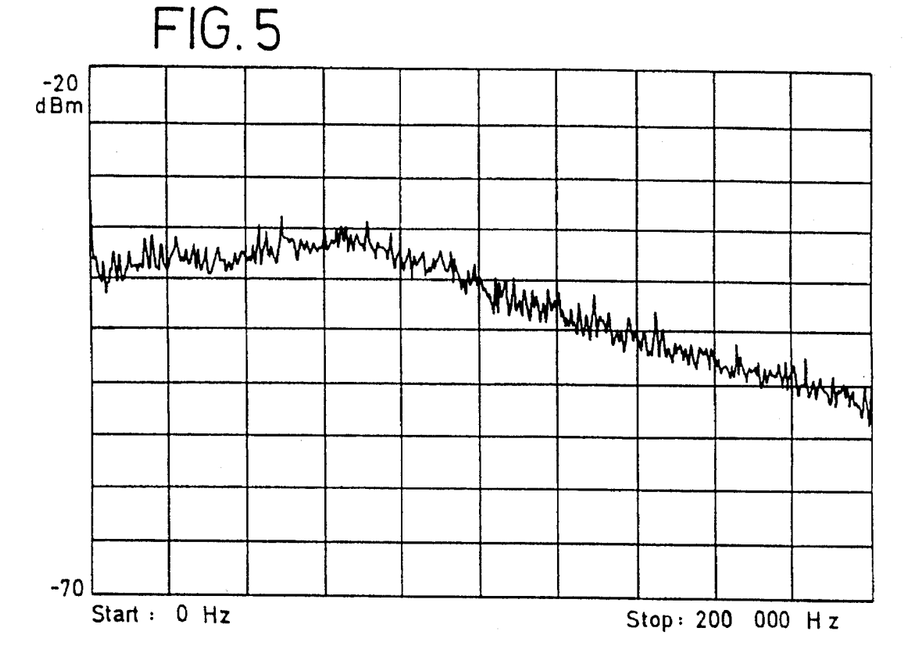
FIG. 5 shows a spectrum taken over the same range as FIG. 1 but with both the clock signals and the data bit signals randomised.
Figure 6:
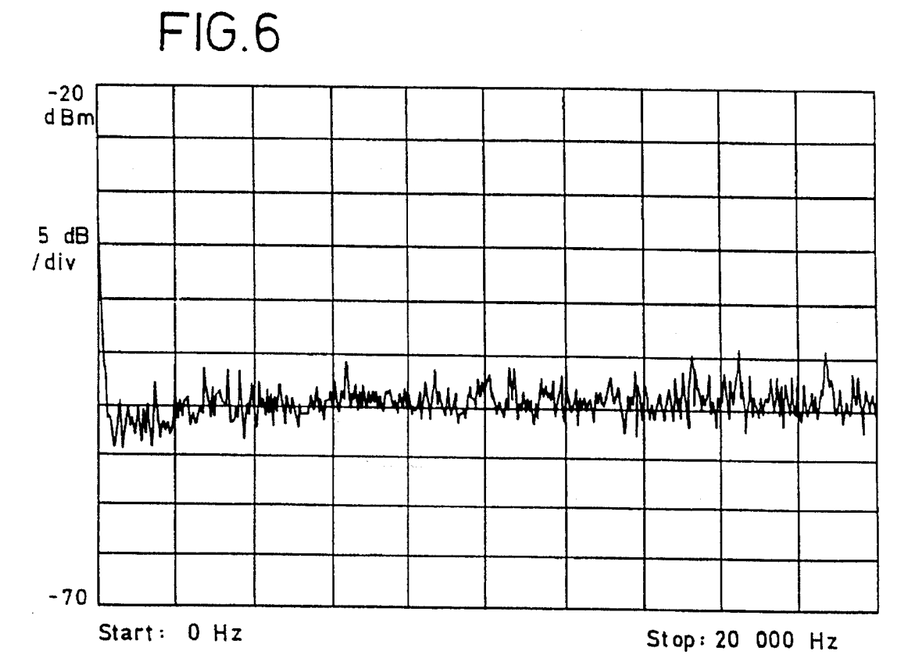
FIG. 6 shows a spectrum taken over the same range as that of FIG. 2 but with both the clock signals and the data bit signals randomised.

FIGS. 5 and 6 show the results obtained when randomisation both of the clock signal and of the data signals is performed. In this respect, FIG. 5 is taken over the same frequency range as FIGS. 1 and 3, whereas FIG. 6 is taken over the same range as FIGS. 2 and 4. It will be appreciated that when both the clock signals and the data bit signals are randomised simultaneously, the frequency spectra as shown in FIGS. 5 and 6 are substantially clear of all single tones. It will be appreciated that the noise produced utilising these techniques is thus completely white and therefore unobjectionable.

Although the frequency spectra of FIGS. 1 to 6 are specific to an audio mixing console, the ability to clear a frequency spectrum of spikes and/or to produce a spectrum which is relatively flat or collapsed can be very useful and/or important in many contexts. For example, there are now EC regulations restricting the electromagnetic radiation emitted from any system. Various techniques, such as care of circuit topology to reduce cross coupling, shielding, filtering and guarding, are utilised but in many circumstances these are not sufficient to sufficiently reduce emissions generated by spikes, for example. These problems, which arise, for example, in any clocked circuit, can be overcome by the method of the present invention.

Figure 7:
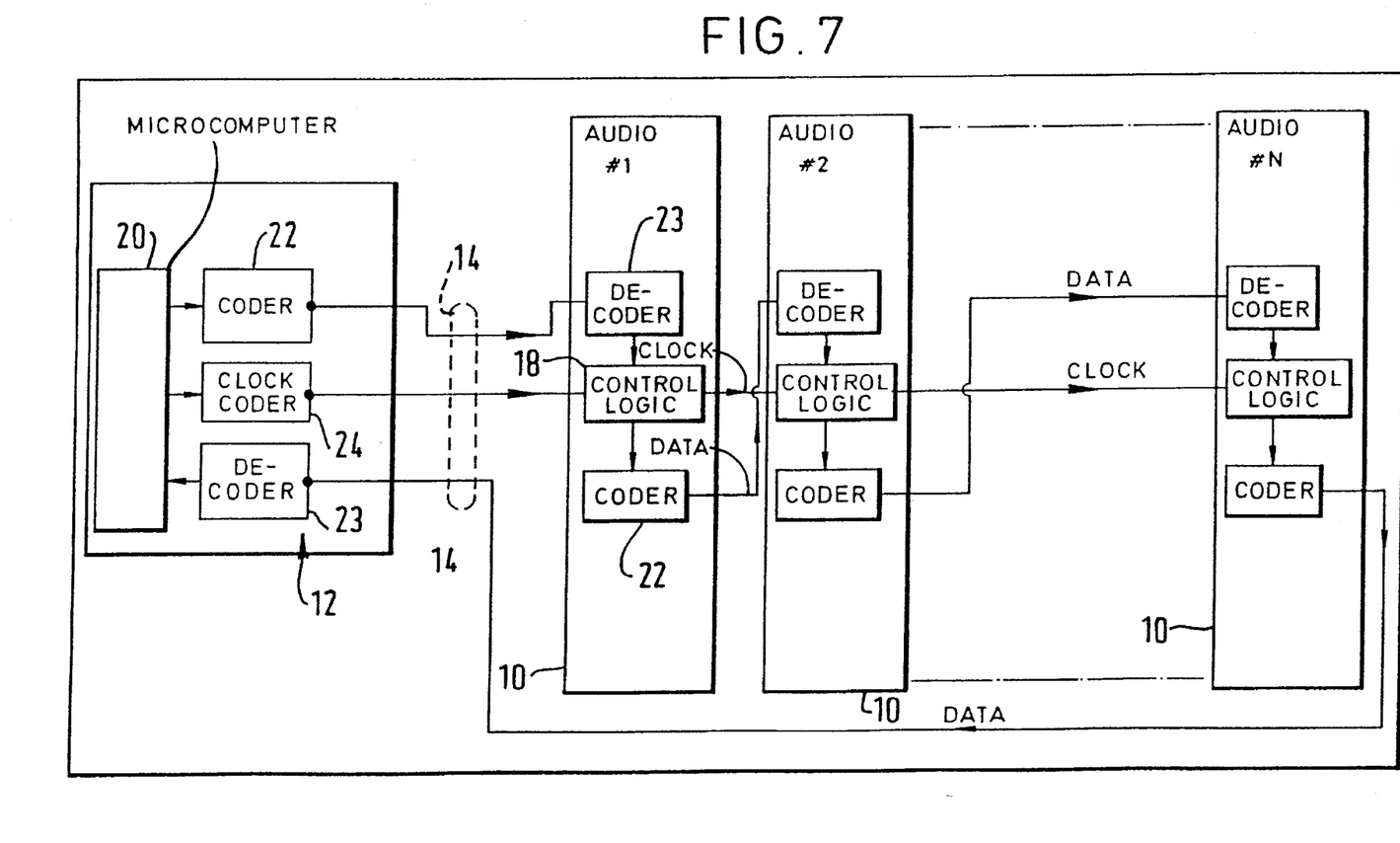
FIG. 7 shows schematically an analogue system of the invention incorporating digital control means.

FIG. 7 shows schematically an audio mixing console controlled by digital control means the audio mixing console incorporates N audio components or modules 10, each generally providing one channel of the console. The components and functions of each audio module 10 may be chosen as required. However, each said audio module 10 will generally comprise at least one shift register to receive digital data and fader circuits controlled by the or each shift register. The faders will be arranged to adjust controllable audio amplifiers by way of appropriate digital to analogue conversion circuits.

In the embodiment illustrated, each audio module 10 is connected in series to the other audio modules 10, with the first module 10 being serially connected to a digital control circuit or controller 12, and the last module 10 being similarly connected To the digital controller 12. The arrangement is such as To provide a serial loop, and the logic of the controller and/or of the modules is arranged such that data passes around the serial loop in one direction only, that is, so that the serial loop is undirectionally.

The structure and functions of the digital controller 12 may be determined as convenient. As will be described below, the controller 12 is arranged to provide digital signals to the audio modules 10, the digital signals comprising both clock signals and data. The digital controller 12 may include processing means (not shown) to generate the data, for example, or may be connected to receive the data from external means. However, because the controller 12 is a digital circuit, it is physically isolated in the console from the audio modules 10.

In the embodiment illustrated, the controller 12 comprises a data coding circuit 22 which is arranged to randomise data and transmit it to the audio modules 10. In this respect, each audio module 10 is provided with a respective data decoder 23. The controller 12 is also provided with a clock coder 24 which is arranged to randomise or scramble clock signals which are fed to the audio modules 10. The controller 12 also comprises a data decoder 23 which is substantially identical in construction to the decoders 23 of the audio modules 10.

The serial loop is physically provided by way of a ribbon cable 14 which interconnects a connector (not shown) of the controller 12 and substantially identical connectors of the audio modules 10. To form the serial loop, each audio module 10 is provided with two identical connectors.

It will be immediately apparent from FIG. 7 that as well as having a data decoder 23 for the data, each audio module 10 also has a data coder 22. The data coder 22 of each module 10 is substantially identical to the data coder 22 of the controller 12. Thus, at each audio module 10 the data received is decoded for use by that module, and is also encoded for transmission to the next module. This means that the data is always transmitted in its coded, randomised form, and also that the data is only decoded directly at its point of use. This reduces considerably the opportunity for crosstalk or any interference from the uncoded data.

It will also be appreciated that the coded clock signals from the clock coder 24 of the controller 12 are applied to control logic, generally indicated 18, of each audio module 10 for control of that module. Furthermore, the control logic 18 of one audio module 10 passes on the coded clock signal to the next audio module 10. As the clock signals are transmitted through the console in randomised form, the opportunity for interference or intermodulation is considerably reduced.

Figure 8:
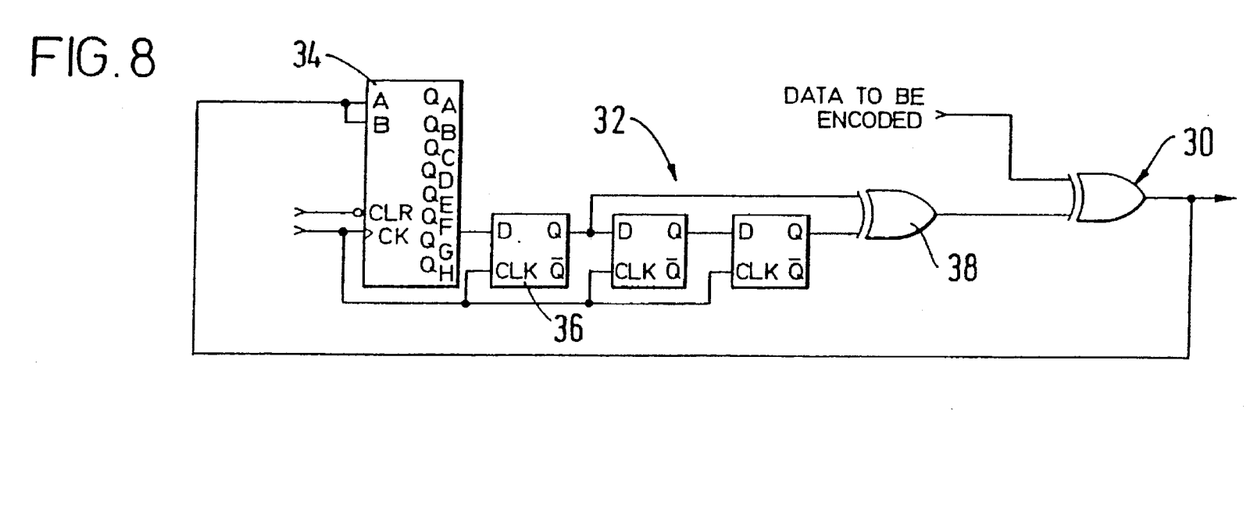
FIG. 8 shows a coding circuit provided in the controller and in each audio module of the analogue system for randomising or scrambling data signals.

The data to be sent to each audio module 10 from the controller 12 would, in the absence of the data coder 22, be a regular stream of data bits. However, because, and as discussed above, a regular stream of bits produces noise interference, the data stream is randomised or scrambled such that it is not cyclic or repetitive. FIG. 8 shows an example of an encoder circuit which may be used to comprise the coder circuit 22 of both the controller 12 and of the audio modules 10. In the encoder of FIG. 8, the data to be randomised is fed, by way of an exclusive OR gate 30 through a maximal length pseudo random bit sequence generator, shown generally at 32. This pseudo random bit generator comprises, in known manner, a clocked shift register to which feedback is applied and which is tapped. In the circuit shown in FIG. 8, the clocked shift register comprises a register 34 whose effective length is increased by the provision of a number of clocked bistables 36. The output of the circuit is fed back to the input of the shift register 34. The output of the effective shift register and a tapped output thereof are fed to inputs of a further exclusive OR gate 38. The output of gate 38 is a pseudo random number sequence which is applied To one input of the exclusive OR gate 30 whilst the data to be encoded is fed to its other input. The output of the exclusive OR gate 30 is the encoded data output.

The operation of the coding circuit shown in FIG. 8 will not be described in further detail herein. However, it is important To note that a maximal length pseudo number sequence generator should be used. Thus, the full set of random numbers repeated in a pattern should be utilised, rather than a subset of those numbers. This enables decoding to be made by a complementary circuit without links between coder and decoder being required.

It will be appreciated that as the data output appears completely random, it has no fundamental frequency and consequently there is no interference from crosstalk.

Figure 9:
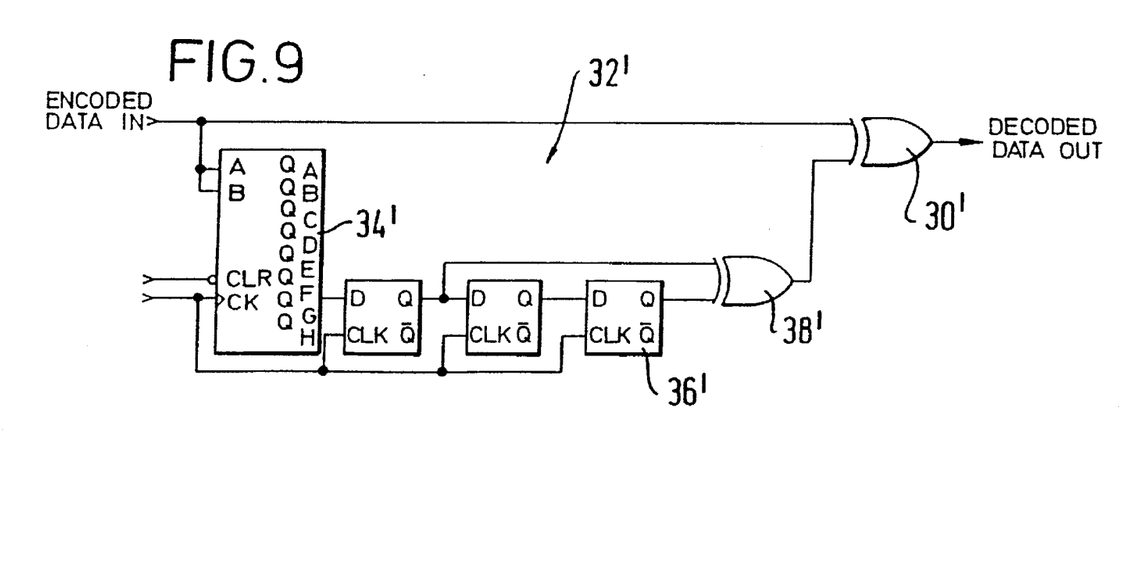
FIG. 9 shows a decoding circuit for decoding the data coded by the coding circuit of FIG. 8.

At each audio module 10 (FIG. 7) the encoded data from a coding circuit 22 is received by the respective decoding circuit 23. An example of a decoding circuit is shown in FIG. 9 and it will be appreciated that the decoding circuit 23 is substantially identical to the coding circuit 22. Thus, in the circuit of FIG. 9, the encoded data is fed to a clocked shift register of a pseudo random bit sequence generator 32'. The clocked shift register comprises a shift register 34' and further clocked bistables 36'. The encoded data is fed to the input of the shift register 34' and the output of the effective register, and an output tapped from the bistables 36' is fed to an exclusive OR gate 38'. The output of the gate 38', which is the random number generated by the pseudo random number generator 32' is fed to one input of an exclusive OR gate 30' to whose second input the encoded data is also fed. As will be clear from the description below, the random number generated by the pseudo random bit sequence generator 32' will be the same as that generated by the generator 32 of the coder of FIG. 8. It will therefore be appreciated that as the encoded data is an exclusive OR combination of the random numbers and the data, the output of the exclusive OR gate 30', which is combining the randomised data with the same random number, will be the original data.

Because the numbers generated by the coder and the decoder are the same, there is no need to link the coder and the decoder in order to recover the original data. This process is described and illustrated in our copending British patent application which also claims priority from British patent application No. 9205291.9.

It has been seen above that The data to be applied to the individual audio modules 10, which is produced as a regular data stream, is transmitted from the controller 12 to the first audio module 10 as a random sequence to avoid any crosstalk problems. The random sequence is decoded locally and then recoded for transmission to the next audio module. This means that the opportunity for interference from the regular data stream is seriously curtailed because the regular data stream only exists at the point of use.

Of course, and as discussed above, logic circuits require to be clocked, generally in synchronism, and regular clock pulses do, as illustrated graphically above, provide interference. Generally, because clock signals are well outside of the audio range, they are not considered to cause problems. However, clock signals can mix with other high frequency sources, for example from a cassette recorder.

In accordance with the invention, the clock signals are also randomised in the sense that it is ensured that they are not cyclic or repetitive. In this respect, in the embodiment illustrated, all of the logic circuits are arranged to be clocked on the receipt of a rising edge. To randomise the clock signals, the clock pulses are altered to have a variable mark-space ratio. This means that the clock pulses arrive at random times and have random widths. They are therefore transmitted as randomised signals and, as described above, appear as white noise rather than as tones in the audio channel. Thus, away from the actual logic circuits using clock pulses, the clock signals appear to be randomised.

However, when a rising edge of the randomised clock signal arrives at logic circuits, all of the logic circuits react to the arrival of that rising edge. Furthermore, if the rising edges of randomised clock pulses are aligned with the rising edges of the original clock pulses, the necessary synchronism will be retained throughout the system.

Figure 11:
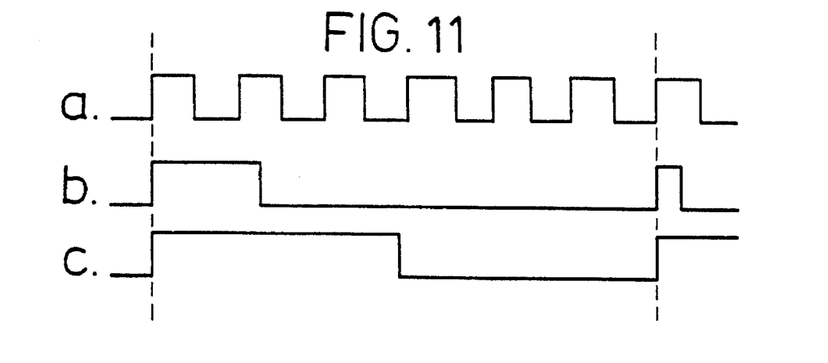
FIG. 11 shows pulse diagrams a, b and c illustrating the method of randomising the clock signals.

The randomisation of a clock signal is illustrated in FIG. 11. In this respect, FIG. 11a shows a conventional regular pulsed clock signal, for example of 1 MHz. As illustrated, the clock signal is shown to have 7 rising edges. FIG. 11b shows, a clock signal which is one seventh of the clock frequency of FIG. 11a, as is the signal of FIG. 11c. Both the clock signals of FIGS. 11b and 11c have rising edges which exactly coincide with the first and seventh pulses of the regular clock signal, and hence can trigger a logic circuit in synchronism therewith. However, the mark-space ratios of the signals 11b and 11c are very different and would appear, during transmission, to be random.

Figure 10:
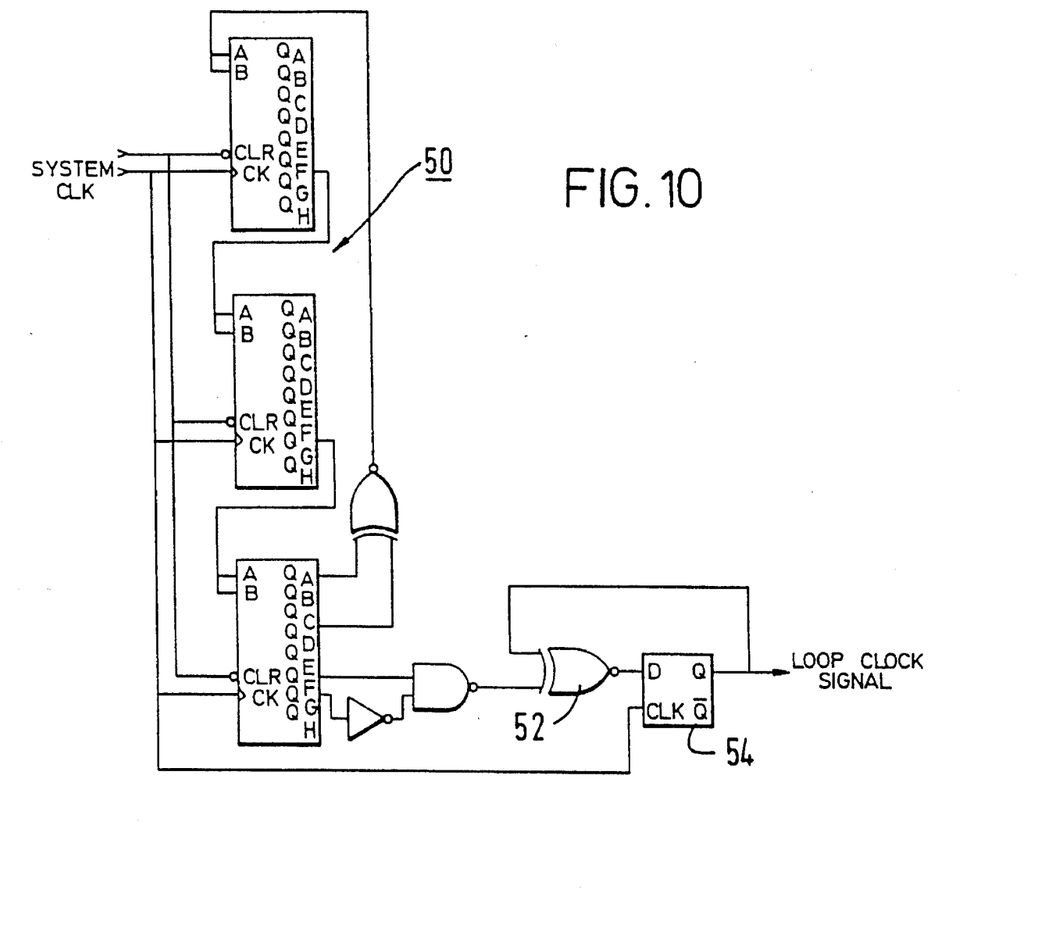
FIG. 10 shows a first embodiment of an encoder for scrambling or randomising clock signals.

A circuit for producing a random mark-space ratio divided from a regular clock signal is shown in FIG. 10. Again, the coding circuit of FIG. 10 is based on a clocked and tapped shift register arrangement generally indicated at 50 for generating a random number. This random number is fed by way of an exclusive NOT OR gate 52 to a clocked bistable 54 whose output is the randomised clock signal applied to the serial loop. It will be seen that the other input to the bistable 54 is the system clock and that the output is fed back to the exclusive NOT OR gate 52. The generation of the randomised clock signal is generally by way of techniques similar to those described above with reference to the data encoding, and accordingly is not further described herein.

Figure 12A:
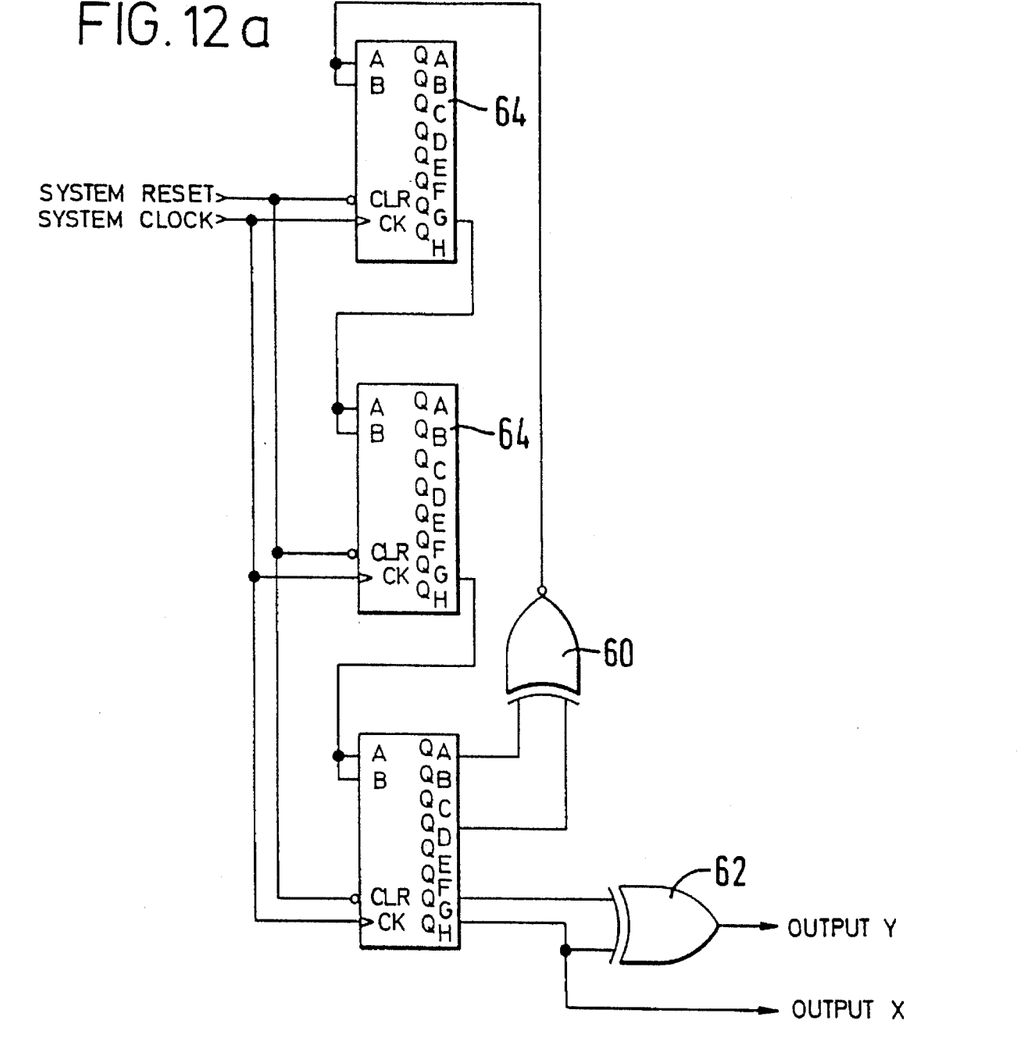
FIGS. 12a and 12b show a further embodiment of an encoder for randomising clock signals and FIG. 13 shows pulse diagrams a, b, c and d associated with the encoder of FIGS. 12a and 12b.
Figure 12B:
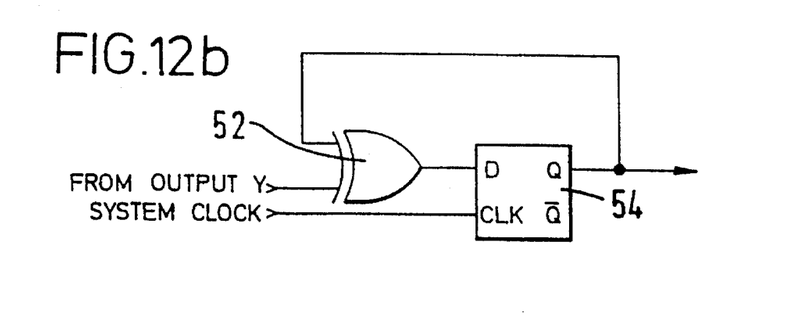

The coding circuit of FIG. 10 to is specifically designed for clocking the analogue audio system as illustrated in FIG. 7. FIGS. 12a and 12b show a similar circuit for producing randomised clock signals, but having a more generalised applicability.

The circuit shown in FIG. 12a comprises a maximal length pseudo bit sequence generator formed of three clocked serially connected shift registers 64. The output is fed back to the first shift register, the output being tapped from the last shift register 64 so that the registers together form a single clocked shift register of the chosen length. The shift registers 64 are clocked by a regular system clock, as indicated. As in the circuits of FIG. 8 and 9, the output of the serial connection of shift registers is fed back to the input by way of an exclusive OR gate 60. It will be appreciated that if the system clock is of a constant frequency, a sequence of random numbers will appear at each output of each of the shift registers 64 and any of these outputs may be used as a randomised clock signal.

Figure 13:
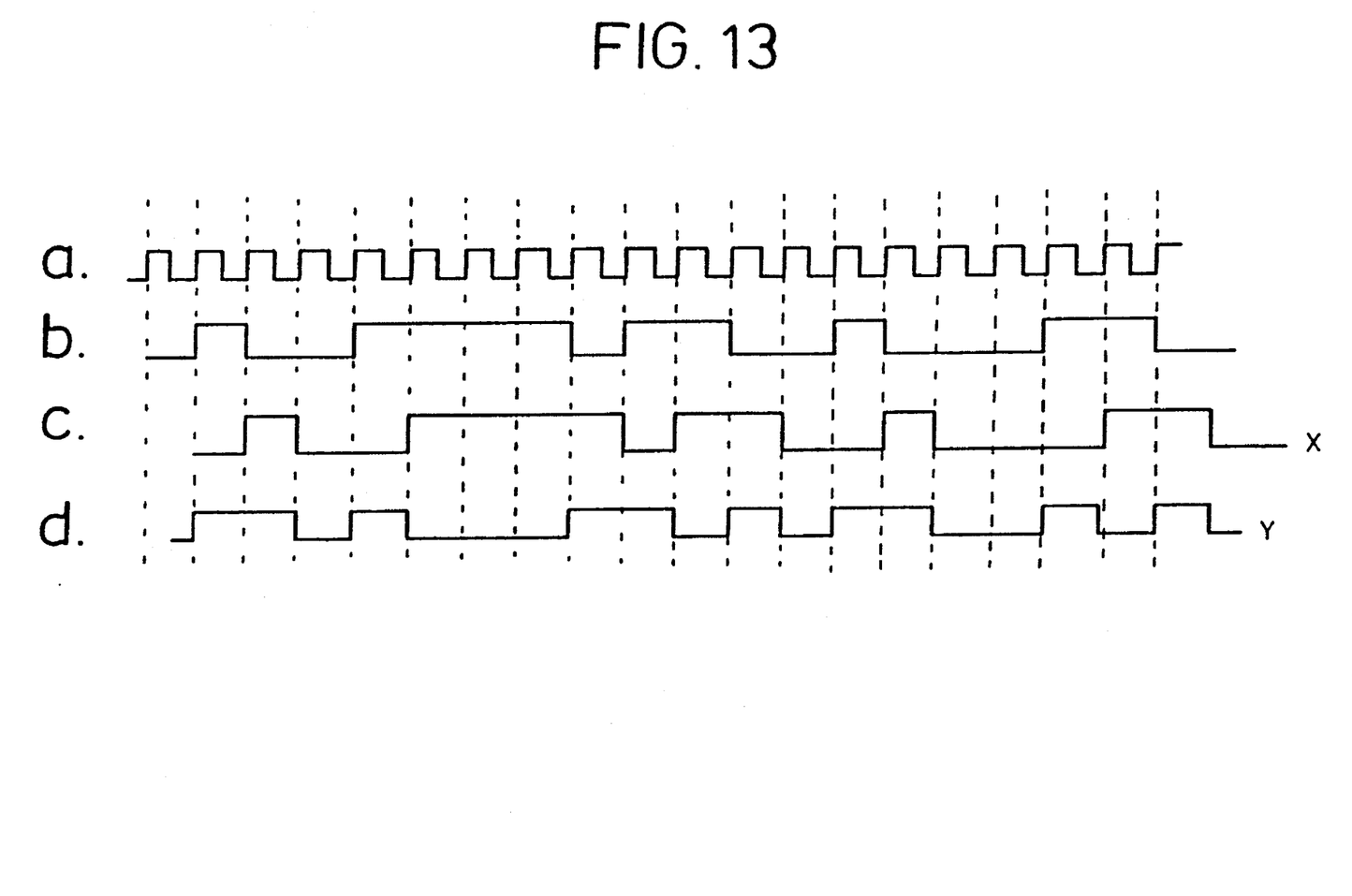

In this respect, FIG. 13a shows a regular system clock applied to the input of the scrambler circuit of FIG. 12a, whereas FIGS. 13b and 13c show the signals on two outputs of the circuit. The output X on the last output of the shift register 64 can be used as a randomised system clock, but, as is clear from FIG. 13, its edges are not synchronised with the applied system clock. The output Y which is the output of an exclusive OR gate 62 to which two outputs of the last shift register have been applied can also be used as a randomised system clock. However, it is generally preferred to apply output Y and the applied system clock to the optional circuit of FIG. 12b to provide an output which has edges which are synchronised with the system clock as described above with reference to FIG. 10.

In the circuits of FIG. 12, the average clock frequency output on output X is the system clock frequency divided by 4.

It will be appreciated that the invention has been described above by way of example only and, in particular, that other means may be employed for providing the random clock signals. Furthermore, although the invention has most particular application to audio systems, the techniques described can be utilised for any systems which utilise clocking.

Other variations and modifications to the particular embodiments described above may be made within the scope of This application.

What is claimed is:

1. A method of controlling a synchronous electrical system having a number of logic circuits in which a clock signal comprising a train of clock pulses is applied to the logic circuits such that they are driven in synchronism with the clock pulses, the method comprising the steps of dividing a regular clock signal having regularly occurring clock pulses to generate a randomized clock signal having a train of clock pulses with a varied mark-space ratio, and applying the randomized clock signal to the logic circuits to drive the logic circuits in synchronism with clock pulses of the randomized clock signal.

2. A method according to claim 1, wherein said randomized clock signal divided from said regular clock signal is applied to each of the logic circuits of said number of logic circuits.

3. A method according to claim 1, wherein said regular clock signal is divided to provide a plurality of randomized clock signals, and wherein the method further comprises the step of applying a respective randomized clock signal to each logic circuit of said number of logic circuits.

4. A method according to claim 1, comprising generating each randomized clock signal by a random number generator to which a regular clock signal is applied.

5. A method according to claim 1, wherein each logic circuit is driven by edges of the randomized clock signal.

6. A method according to claim 5, wherein one selected edge of each randomized clock signal occurs substantially concurrently with a selected edge of said regular clock signal, and wherein said selected edges are rising edges.

7. A method according to claim 4, wherein said randomized clock signal is generated by a random number generator arranged to apply a random sequence to one input of a bistable circuit, and further comprising applying the regular clock signal to a clock input of said bistable circuit to generate a randomized output signal having rising edges which coincide with rising edges of the regular clock signal.

8. A synchronous electrical system comprising a number of logic circuits, and control means for applying a clock signal to the logic circuits, the clock signal comprising a train of clock pulses which drive the logic circuits in synchronism therewith, wherein said control means comprises means to divide a regular clock signal having regularly occurring clock pulses to generate a randomized clock signal having a train of clock pulses having a varied mark-space ratio, and wherein said control means applies said randomized clock signal to said logic circuits such that the logic circuits are driven in synchronism with the clock pulses of the randomized clock signal.

9. A synchronous electrical system according to claim 8, wherein said control means comprises a random number generator to an input of which said regular clock signal is applied to generate said randomized clock signal.

10. A synchronous electrical system according to claim 9, wherein said random number generator has a clock input to which said regular clock signal is applied, and comprises one or more tapped shift registers.

11. A synchronous electrical system according to claim 10, wherein said control means further comprises a bistable circuit having a first input to which said regular clock signal is applied, and a second input to which an output from said random number generator is applied, and wherein said bistable circuit has an output at which said randomized clock signal is provided.

12. A synchronous electrical system according to claim 8, wherein said electrical system is an analog system and comprises digital control means for controlling said logic circuits.

13. A synchronous electrical system according to claim 12, wherein each logic circuit controls an audio component.

* * * * *